US006408834B1

United States Patent
Brackney et al.

(10) Patent No.: US 6,408,834 B1
(45) Date of Patent: Jun. 25, 2002

(54) SYSTEM FOR DECOUPLING EGR FLOW AND TURBOCHARGER SWALLOWING CAPACITY/EFFICIENCY CONTROL MECHANISMS

(75) Inventors: Lary J. Brackney; Thomas A. Dollmeyer; Paul R. Miller; Chuan He, all of Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/773,654

(22) Filed: Jan. 31, 2001

(51) Int. Cl.[7] .............................................. F02M 25/07
(52) U.S. Cl. ................... 123/568.21; 60/602; 60/605.2
(58) Field of Search ............................ 60/602, 605.2; 123/568.21

(56) References Cited

U.S. PATENT DOCUMENTS

| | | | |
|---|---|---|---|
| 4,445,488 A | 5/1984 | Tanaka et al. |
| 4,942,860 A | 7/1990 | Chujo et al. |
| 4,969,104 A | 11/1990 | Suzuki et al. |
| 5,063,510 A | 11/1991 | Jurgens et al. |
| 5,086,745 A | 2/1992 | Nishimura et al. |

(List continued on next page.)

Primary Examiner—Paul J. Hirsch
(74) Attorney, Agent, or Firm—Barnes & Thornburg (57) ABSTRACT

A system for decoupling EGR flow and turbocharger swallowing capacity/efficiency control mechanisms includes a multiple-input multiple-output (MIMO) transform manager coupled to one or more of an EGR valve, an exhaust throttle and a variable geometry turbocharger (VGT) actuator of an internal combustion engine. The MIMO transform manager is responsive to commanded charge flow and EGR fraction parameters to decouple the EGR/exhaust throttle and VGT control parameters such that these control mechanisms may be controlled individually and independently of each other. One transform output is provided to a first compensator for controlling EGR flow and/or exhaust throttle operation as a function of charge flow error. The other transform output is provided to a second independent compensator for controlling VGT operation also as a function of charge flow error. Both compensators are configured to provide for transient compensator gain adjustment based on the degree of charge flow error, and the VGT compensator is further configured to provide for transient compensator gain adjustment based on a ratio of commanded fueling and oxygen/fuel ratio. The resulting control strategy provides for independent control of EGR flow/exhaust throttle and a VGT actuator, thereby resulting in better and more consistent control over mass charge flow.

21 Claims, 9 Drawing Sheets

U.S. PATENT DOCUMENTS

| | | | |
|---|---|---|---|
| 5,150,696 | A | 9/1992 | Kabasin et al. |
| 5,203,311 | A | 4/1993 | Hitomi et al. |
| 5,205,265 | A | 4/1993 | Kashiyama et al. |
| 5,273,019 | A | 12/1993 | Matthews et al. |
| 5,301,126 | A | 4/1994 | Nishimura et al. |
| 5,303,168 | A | 4/1994 | Cullen et al. |
| 5,440,880 | A | 8/1995 | Ceynow et al. |
| 5,503,129 | A | 4/1996 | Robichaux et al. |
| 5,509,394 | A | 4/1996 | Hitomi et al. |
| 5,524,591 | A | 6/1996 | Hirota et al. |
| 5,558,070 | A | 9/1996 | Bell et al. |
| 5,617,726 | A | 4/1997 | Sheridan et al. |
| 5,666,931 | A | 9/1997 | Pierik et al. |
| 5,682,684 | A | 11/1997 | Wentzlaff et al. |
| 5,690,083 | A | 11/1997 | Gopp et al. |
| 5,724,950 | A | 3/1998 | Shino et al. |
| 5,738,126 | A | 4/1998 | Fasten |
| 5,755,101 | A | 5/1998 | Free et al. |
| 5,771,867 | A | 6/1998 | Amstutz et al. |
| 5,771,868 | A | 6/1998 | Khair |
| 5,778,674 | A | 7/1998 | Kimura |
| 5,785,030 | A | 7/1998 | Paas |
| 5,791,319 | A | 8/1998 | Friedrich et al. |
| 5,797,370 | A | 8/1998 | Kimura et al. |
| 5,832,896 | A | 11/1998 | Phipps |
| 5,845,627 | A | 12/1998 | Olin et al. |
| 5,889,203 | A | 3/1999 | Wild et al. |
| 5,921,223 | A | 7/1999 | Fukuma |
| 5,921,224 | A | 7/1999 | Sinnamon |
| 5,927,075 | A | 7/1999 | Khair |
| 5,934,249 | A | 8/1999 | Nanba et al. |
| 5,964,820 | A | 10/1999 | Miwa et al. |
| 6,016,788 | A * | 1/2000 | Kibe et al. ............. 123/568.21 |
| 6,062,026 | A * | 5/2000 | Woollenweber et. al. ... 60/605.2 |
| 6,209,530 | B1 | 4/2001 | Faletti et al. |
| 6,253,748 | B1 * | 7/2001 | Engel et al. ........... 123/568.21 |
| 6,298,835 | B1 * | 10/2001 | Horie et al. ............. 12/568.21 |

* cited by examiner

SYSTEM FOR DECOUPLING EGR FLOW AND TURBOCHARGER SWALLOWING CAPACITY/EFFICIENCY CONTROL MECHANISMS

FIELD OF THE INVENTION

The present invention relates generally to systems for controlling EGR flow and/or turbocharger swallowing capacity/efficiency, and more specifically to systems for providing such control as a function of commanded charge flow and EGR fraction.

BACKGROUND OF THE INVENTION

Figure 1:
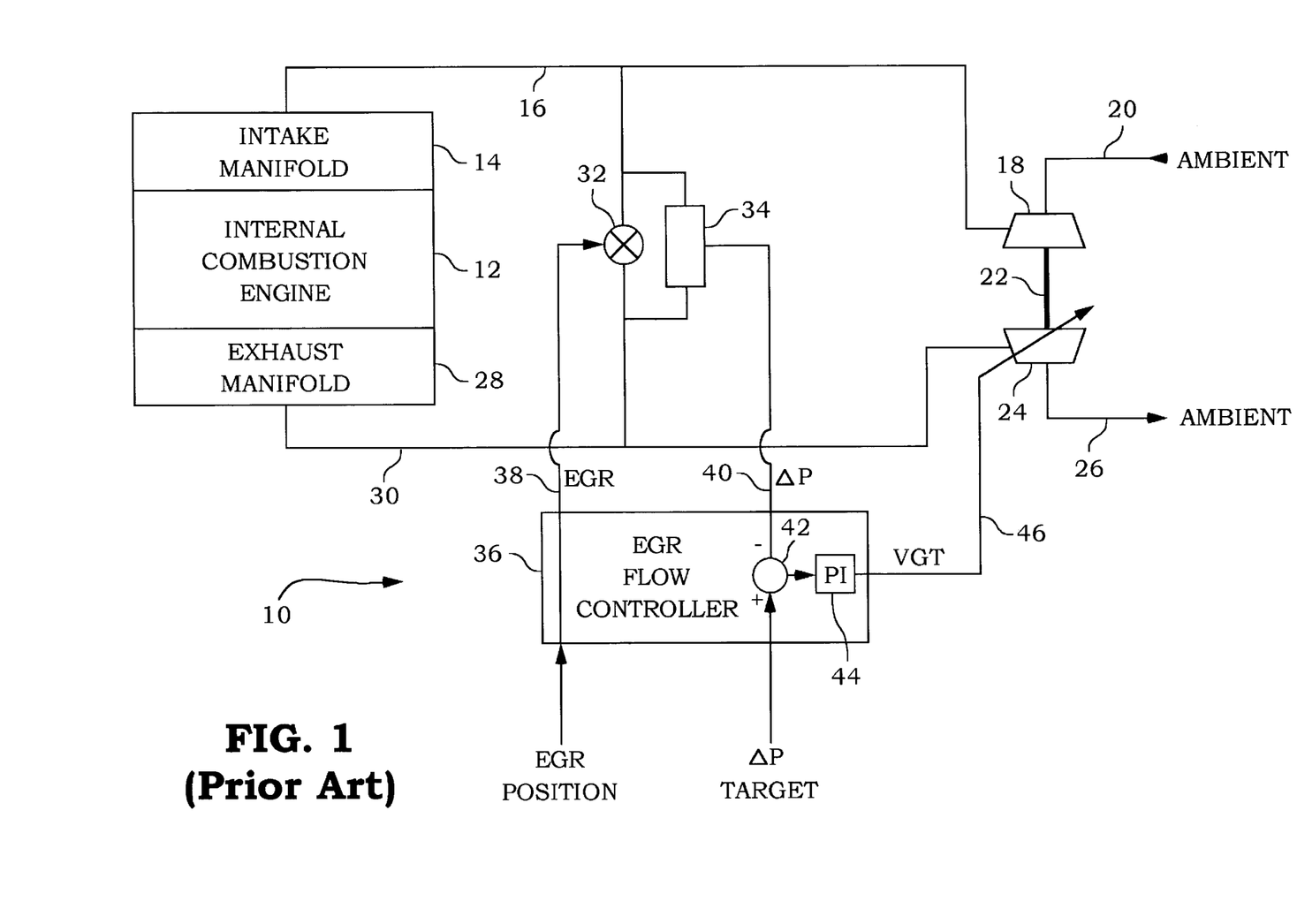
FIG. 1 is a diagrammatic illustration of one known EGR and turbocharger swallowing capacity control system for an internal combustion engine.

Systems for controlling EGR flow and/or turbocharger swallowing capacity are known and have been widely implemented, particularly in the heavy diesel engine industry. An example of one known system 10 for providing such control is shown in FIG. 1 and 10 includes an internal combustion engine 12 having an intake manifold 14 fluidly coupled to a compressor 18 of a turbocharger via intake conduit 16, wherein the compressor 18 receives fresh air via intake conduit 20. The turbocharger compressor 18 is mechanically coupled to a turbocharger turbine 24 via shaft 22, wherein turbine 24 is fluidly coupled to an exhaust manifold 28 of engine 12 via exhaust conduit 30, and is further fluidly coupled to ambient via exhaust conduit 26. An EGR valve 32 is disposed in fluid communication with the intake conduit 16 and the exhaust conduit 30, and a differential pressure sensor, or ΔP sensor, 34 is disposed across the EGR valve 32 to sense a pressure change, or delta pressure, across valve 32. An electronic EGR flow controller 36 has a first input receiving a signal indicative of desired EGR valve position, and has a first output electrically connected to EGR valve 32 via signal path 38. In the system shown in FIG. 1, the EGR flow controller is configured to apply the EGR position signal directly to the EGR valve 32. Controller 36 includes a second input receiving a signal indicative of a desired delta pressure value, or ΔP target, and a third input electrically connected to the ΔP sensor 34 via signal path 40 and receiving a signal thereat indicative of sensed delta pressure (ΔP). The ΔP value is subtracted from the ΔP target value within the EGR flow controller 36 and a ΔP error value produced thereby is applied to a proportional-integral (PI) or other known controller 44. An output of controller 44 produces a variable geometry turbocharger signal VGT that is used to control the swallowing capacity and/or efficiency of the turbocharger via any of a number of known techniques via signal path 46. In operation, charge flow to the engine 12, defined for the purposes of the present invention as the sum of fresh air flow into intake conduit 16 and EGR flow into intake conduit 16, is controlled via control of the position of the EGR valve 32 and the pressure differential between the exhaust conduit 30 and intake conduit 16.

One drawback associated with an EGR flow control system 10 of the type illustrated in FIG. 1 is that there exists an interdependency between charge flow and EGR flow such that EGR flow and fresh air flow cannot be controlled separately. Once EGR flow is established by the EGR flow controller 36, the resulting charge flow is defined by whatever fresh air flow is available. System 10 may therefore be optimized for NOx control or for particulate control, but generally not for both. It would accordingly be desirable to provide for an EGR control system wherein EGR flow and fresh air flow may be controlled separately to therefore gain better and more consistent control over the charge flow.

DESCRIPTION OF THE PREFERRED EMBODIMENTS

For the purposes of promoting an understanding of the principles of the invention, reference will now be made to one or more preferred embodiments illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 2:
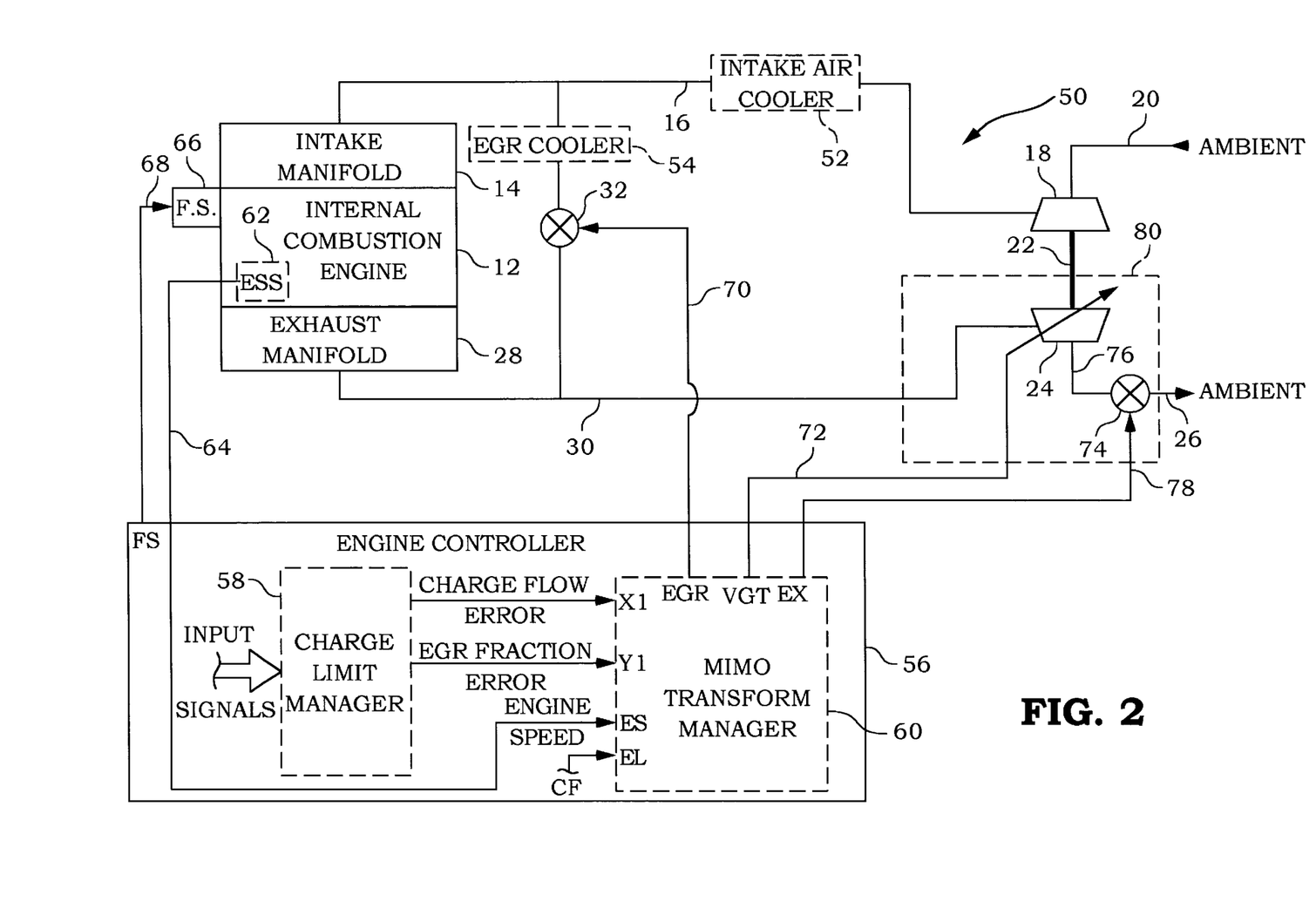
FIG. 2 is a diagrammatic illustration of an EGR and/or turbocharger swallowing capacity control system in accordance with one preferred embodiment of the present invention.

Referring now to FIG. 2, one preferred embodiment of an EGR and/or turbocharger swallowing capacity control system 50, in accordance with the present invention, is shown. System 50 includes several components in common with system 10 of FIG. 1, and like numbers are therefore used to identify like components. For example, system 50 includes an internal combustion engine 12 having an intake manifold 14 fluidly coupled to a compressor 18 of a turbocharger via intake conduit 16, wherein the compressor 18 receives fresh air via intake conduit 20. Optionally, as shown in phantom in FIG. 2, system 50 may include an intake air cooler of known construction disposed in line with intake conduit 16 between the turbocharger compressor 18 and the intake manifold 14. The turbocharger compressor 18 is mechanically coupled to a turbocharger turbine 24 via shaft 22, wherein turbine 24 is fluidly coupled to an exhaust manifold 28 of engine 12 via exhaust conduit 30, and is further fluidly coupled to ambient via exhaust conduit 26. An EGR valve 32 is disposed in fluid communication with the intake conduit 16 and the exhaust conduit 30, and an EGR cooler 54 of known construction may optionally be disposed between EGR valve 32 and intake conduit 16 as shown in phantom.

System 50 includes an engine controller 56 that is preferably microprocessor-based and is generally operable to control and manage the overall operation of engine 12. Engine controller 56 includes a memory unit (not shown) as well as a number of inputs and outputs for interfacing with various sensors and systems coupled to engine 12. Controller 56, in one embodiment, may be a known control unit sometimes referred to as an electronic or engine control module (ECM), electronic or engine control unit (ECU) or the like, or may alternatively be a control circuit capable of operation as will be described hereinafter. In any case, engine controller 56 preferably includes a charge limit manager 58 receiving a number of input signals and producing a charge flow error signal and an EGR fraction error signal. In the embodiment illustrated, the charge flow error signal is preferably a difference between actual or estimated charge flow (i.e., the sum of fresh air flow and EGR flow to intake manifold 14) and a desired charge flow, and the EGR fraction error signal is preferably a difference between actual or estimated EGR flow and a desired EGR flow. Alternatively, at least for purposes of the present invention, the charge limit manager 58 may be configured to produce a charge flow signal in place of the charge flow error signal and to produce an EGR fraction signal in place of the EGR fraction error signal. In any case, further details relating to the charge limit manager 58 are given in U.S. patent application Ser. No. 09/773,151 entitled SYSTEM FOR MANAGING CHARGE FLOW AND EGR FRACTION IN AN INTERNAL COMBUSTION ENGINE, which is assigned to the assignee of the present invention, and the disclosure of which is incorporated herein by reference.

Engine controller 56 also includes a multiple-input/multiple-output (MIMO) transform manager 60 receiving at inputs X1 and Y1 the charge flow error and EGR fraction error signals respectively. Manager 60 also includes an engine speed input ES electrically connected to an engine speed sensor 62 coupled to, or disposed within, engine 12 via signal path 64. Engine speed sensor 62 is preferably of known construction and is operable to produce an engine speed signal indicative of engine rotational speed. In one embodiment, sensor 62 is a Hall effect sensor operable to determine engine speed by sensing passage thereby of a number of equi-angularly spaced teeth formed on a gear or tone wheel. In this embodiment, the gear or tone wheel further includes an extra tooth whereby sensor 62 is operable to determine current engine position relative to this extra tooth. Alternatively, engine speed sensor 62 may be any other known sensor operable as just described including, but not limited to, a variable reluctance sensor or the like.

MIMO transform manager 60 also includes an engine load input EL receiving thereat a commanded fueling signal CF generated within engine controller 56. As is known in the art, engine controller 56 is responsive to a number of input signals including, for example, engine speed, torque request, and the like, to determine a current fueling command value. This commanded fueling value CF is typically converted by controller 56 to a fueling signal FS which is provided to a fuel system 66 of engine 12 via signal path 68. The fuel system 66 is, in turn, responsive to the fueling signal FS to correspondingly supply fuel to engine 12. In any case, the commanded fueling value CF is provided to the engine load input EL of manager 60, wherein manager 60 is preferably operable to convert the commanded fueling value to a current engine load value using well known equations therefore. Alternatively, engine controller 56 is typically operable to compute from the commanded fueling value CF a current engine load value for use with one or more control algorithms and/or for broadcast onto a serial data link (not shown). In this case, transform manager 60 may be configured to receive this engine load signal directly from the engine controller 56. Alternatively still, the MIMO transform manager 60 may be configured to make use of the commanded fueling value CF directly, as will be described in greater detail hereinafter. In any case, the processing of signals received at inputs X1, Y1, ES and EL of the MIMO transform manager 60 will be described in greater detail hereinafter with respect to FIGS. 4–13.

MIMO transform manager 60 includes a number of outputs for controlling EGR flow and/or turbocharger swallowing capacity and efficiency. For example, an EGR output of manager 60 is electrically connected to EGR valve 32, wherein EGR valve 32 is responsive to the EGR signal to establish a corresponding valve position. A variable geometry turbocharger (VGT) output is electrically connected to a turbocharger actuating mechanism via signal path 72, wherein examples of such turbocharger actuating mechanisms will be described hereinafter with respect to FIGS. 3A–3C. Finally, an exhaust throttle output (EX) of manager 60 is electrically connected to an exhaust valve 74 that is fluidly coupled to the turbocharger turbine 24 via conduit 76 and also to exhaust outlet conduit 26. Exhaust valve 74 is responsive to the EX signal to establish a corresponding exhaust valve position.

Figure 3A:
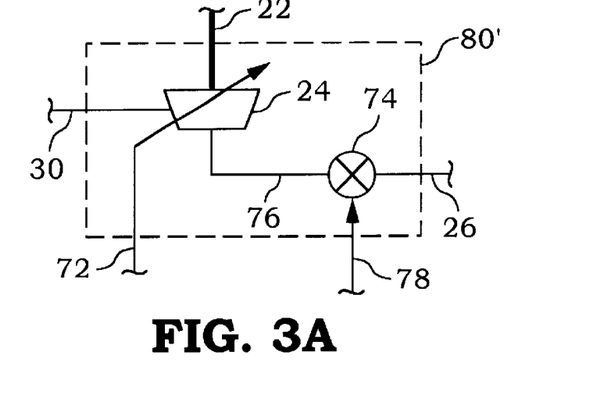
FIG. 3A is a diagrammatic illustration of one preferred structural arrangement for adjusting turbocharger swallowing capacity in the system of FIG. 2.
Figure 3B:
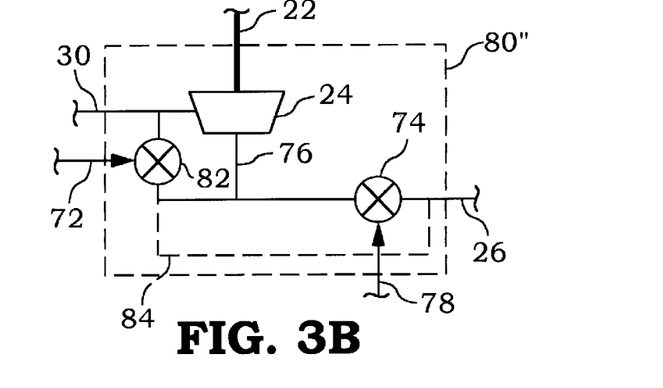
FIG. 3B is a diagrammatic illustration of an alternate structural arrangement for adjusting turbocharger swallowing capacity in the system of FIG. 2.
Figure 3C:
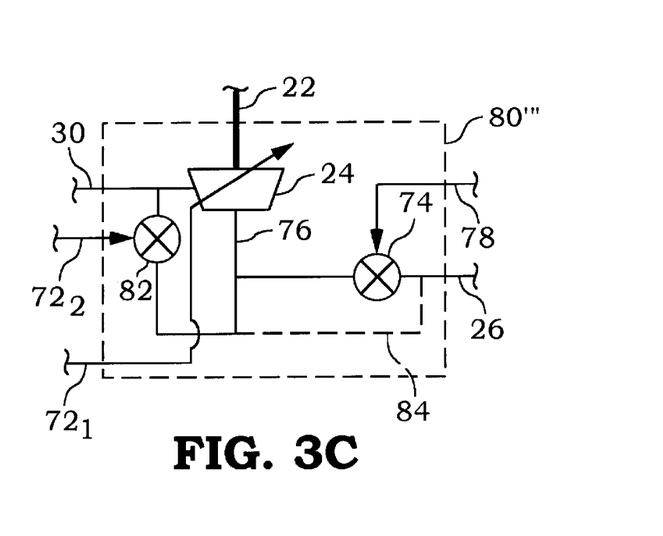
FIG. 3C is a diagrammatic illustration of another alternate structural arrangement for adjusting turbocharger swallowing capacity in the system of FIG. 2.

The present invention contemplates utilizing the MIMO transform manager 60 to control any one, or combination of, the charge flow control actuators including the EGR valve 32 (via the EGR output thereof), the exhaust throttle 74 (via the EX output thereof and any of a number of variable geometry turbocharger actuators as will be described hereinafter with respect to FIGS. 3A–3C (via the VGT output thereof). In general, the present invention contemplates controlling the swallowing capacity and efficiency of the turbocharger via one or more various mechanisms under the direction of the VGT signal and/or the EX signal, and exemplary embodiments of some such mechanisms included within dashed-line box 80 are illustrated in FIGS. 3A–3C. For example, referring to FIG. 3A, one particular embodiment of dashed-line box 80' includes a known electronically controllable variable geometry turbocharger turbine 24 responsive to the VGT signal to establish a corresponding turbine geometry as illustrated in FIG. 3A by signal line 72. Exhaust throttle 74, controlled by the EX signal via signal path 78, is included in FIG. 3A, although it is to be understood that embodiment 80' need not necessarily include exhaust throttle 74. Referring now to FIG. 3B, another embodiment of dashed-line box 80 includes an electronic wastegate 82 of known construction and electrically connected to signal path 72. In operation, the wastegate 82 may be controlled to divert a desired amount of exhaust flow around the turbocharger turbine 24, as is known in the art, and the swallowing capacity of the turbocharger may be accordingly be electronically modulated via control of wastegate 82 by the MIMO transform manager 60. In this embodiment, the outlet of the wastegate may be fluidly connected to exhaust gas conduit 76 as shown in FIG. 3B, or may alternatively be routed around the exhaust valve 74 by fluidly connecting the wastegate outlet directly to the exhaust gas conduit 26 via conduit 84 as shown in phantom. As with the embodiment 80' illustrated in FIG. 3A, it is to be understood that embodiment 80" may, but need not, include exhaust throttle 74. Referring now to FIG. 3C, yet another embodiment of dashed-line box 80'" includes a known electronically controllable variable geometry turbocharger turbine 24 responsive to a first VGT signal on signal path $72_1$ to establish a corresponding turbine geometry as described with respect to FIG. 3A, and also includes a known electronically controllable wastegate 82 responsive to a second VGT signal on signal path $72_2$ to divert a desired amount of exhaust flow around turbine 24. As with the embodiment 80" illustrated in FIG. 3B, the wastegate outlet may be fluidly connected to exhaust conduit 76 or may alternatively be fluidly connected to exhaust conduit 26 via conduit 84 (shown in phantom) in order to bypass exhaust valve 74. Also, as with the embodiment 80" illustrated in FIG. 3B, it is to be understood that embodiment 8'" may, but need not, include exhaust throttle 74.

Figure 4:
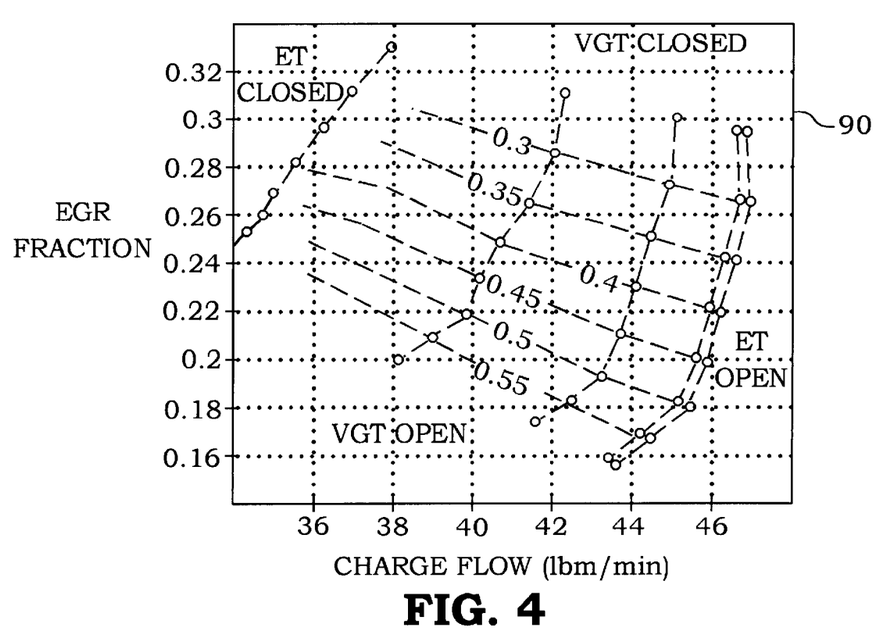
FIG. 4 is a plot of EGR fraction vs. charge flow for one set of engine speed and engine load conditions in the system of FIG. 2.

Referring now to FIG. 4, a plot 90 of EGR fraction vs. charge flow for various exhaust throttle and variable geometry turbocharger (VGT) positions is shown for an arbitrary engine speed and engine load. It is evident from plot 90 that the exhaust throttle and VGT control parameters are interdependent and each have an interactive effect on both outputs, and conventional control approaches utilizing these parameters to control EGR flow and/or turbocharger swallowing capacity/efficiency would typically result in undesirable behavior such as hunting and inconsistent performance for fixed gain sets. However, in accordance with the present invention, it has been observed that at any given engine speed, the exhaust throttle and VGT parameters appear to be substantially orthogonal and therefore substantially independent of each other in a space that is somewhat rotated relative to the EGR fraction/charge flow space. Moreover, it has been determined through experimentation that the degree of rotation of plot 90 is generally a function of engine speed and engine load. In accordance with the present invention, the MIMO charge manager 60 is accordingly configured to transform the EGR fraction/charge flow relationship 90 as a function of engine speed and load to an orthogonal space where these two control parameters exhaust throttle and VGT are substantially orthogonal, and therefore substantially independent of each other. A transformation of coordinates from EGR fraction/charge flow space to this orthogonal space results in decoupled quantities for exhaust throttle and VGT that may then be used as feedback parameters for independent loop closures.

Figure 5:
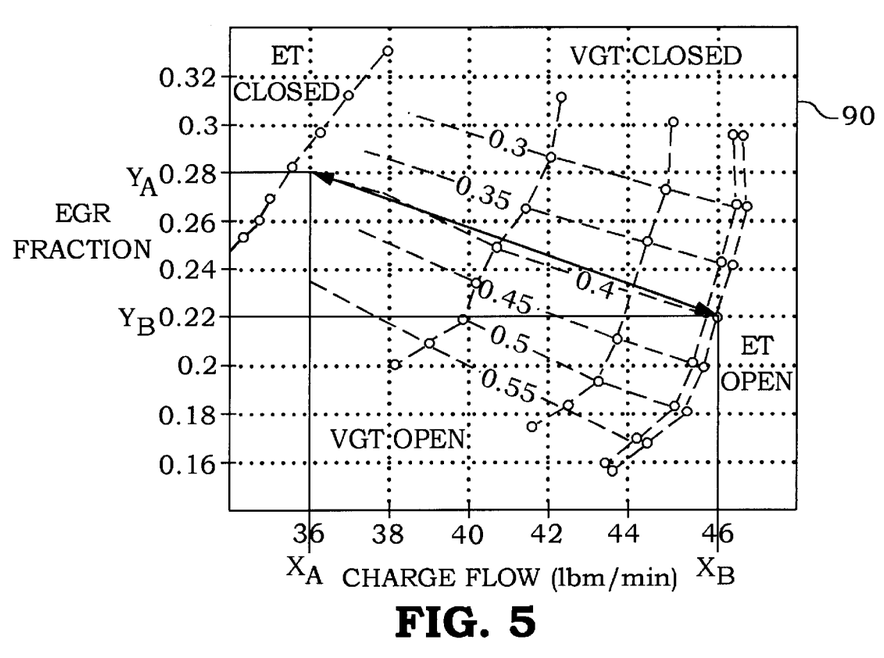
FIG. 5 is a plot of EGR fraction vs. charge flow similar to the plot of FIG. 4 and illustrating a coordinate transformation technique, in accordance with the present invention, for decoupling EGR fraction from charge flow.

Referring now to FIG. 5, one preferred linear transformation strategy 92 is shown for decoupling the exhaust throttle control parameter from the VGT control parameter which consists of a skew along the vertical axis (i.e., the EGR fraction axis), and a rotation to remove the coupling between exhaust throttle setting (ET) and variable geometry turbocharger setting (VGT). This particular transformation may be expressed as a simple matrix multiplication given by the equation:

$$\begin{bmatrix} X2 \\ Y2 \end{bmatrix} = \begin{bmatrix} \cos\theta & -K\sin\theta \\ \sin\theta & K\cos\theta \end{bmatrix} \begin{bmatrix} X1 \\ Y1 \end{bmatrix} \quad (1)$$

where:

$$K=(X_B-X_A)/(Y_A-Y_B) \quad (2),$$

$$\theta=\tan^{-1}[K(Y_A-Y_B)/(X_A-X_B)] \quad (3),$$

and $$X_A = X1\{VGT, \min(ET)\}$$

$$X_B = X1\{VGT, \max(ET)\}$$

$$Y_A = Y1\{VGT, \min(ET)\}$$

$$Y_B = Y1\{VGT, \max(ET)\} \quad (4).$$

In accordance with one preferred technique, the extreme values of X1 and Y1 (i.e., $X_A$, $X_B$, $Y_A$ and $Y_B$) required to compute the foregoing transformation are obtained by sweeping the exhaust throttle 74 from its maximum open position to its minimum closed position for a nominal VG turndown, and a typical set of values for $X_A$, $X_B$, $Y_A$ and $Y_B$ are shown in FIG. 5 by way of example.

Figure 6:
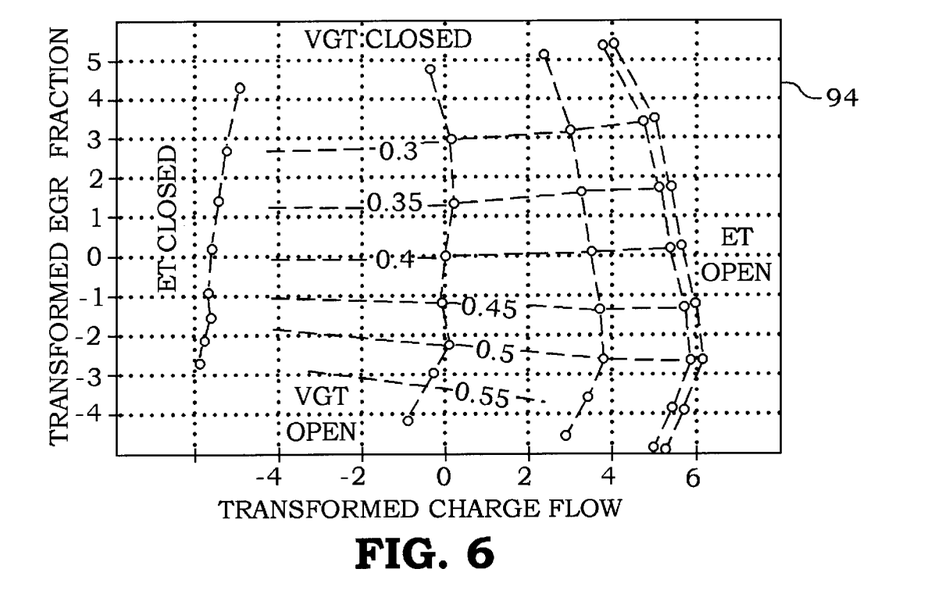
FIG. 6 is a plot of transformed EGR fraction vs. charge flow illustrating a substantial decoupling of EGR fraction from charge flow, in accordance with the present invention.

By applying equations 1–4 to the example plot 90 shown in FIG. 4, the transformed plot 94 of FIG. 6 is generated with K=71.8877, θ=0.4086 radians such that the transformation of equation (1) becomes:

$$\begin{bmatrix} X2 \\ Y2 \end{bmatrix} = \begin{bmatrix} 0.9177 & -28.5636 \\ 0.3973 & 65.9694 \end{bmatrix} \begin{bmatrix} X1 \\ Y1 \end{bmatrix}$$

Observation of FIG. 6 reveals that the foregoing transformation typically does not result in a perfect decoupling of the exhaust throttle and VGT effects, although it does produce a much stronger relationship between each parameter and a corresponding, measurable quantity.

In the foregoing linear transformation, the gain parameter K and the angle parameter θ typically vary with engine speed and engine load. As such, the values of K and/or θ in the above equations are preferably mapped to engine speed and load values as will be described in greater detail hereinafter. It should be understood, however, that the quality of the foregoing transformation diminishes as engine speed and load decrease, and that at sufficiently light load conditions, the charge system has little effect on the mass flow and can only truly affect the EGR fraction. Although not shown in the drawings, the EGR valve 32 has much the same impact on the charge system performance as the exhaust throttle 74, with lines of constant EGR valve lift lying in nearly the same direction as the lines of constant exhaust throttling. Thus, while a general control approach may be to control the EGR valve 32 and exhaust throttle 74 simultaneously, one reasonable alternative control approach for many operating points is to treat the EGR valve 32 as an extension of the exhaust throttle 74, and to control the two actuators in cascade fashion. For example, in one embodiment, the EGR valve 32 may be controlled between its fully closed and fully open position with the exhaust valve 74 fully open. Once the EGR valve 32 is fully open, the exhaust throttle 74 may then be controlled between its fully open and slightly open positions. Alternatively, the exhaust valve 74 may be controlled first followed by control of the EGR valve 32. In either case, a cascade control arrangement of this type provides for the widest possible range of exhaust throttle/EGR valve control that is substantially decoupled from the VGR control parameter. In systems that do not include an exhaust throttle 74, an appropriate transformation matrix for the available parameters may be derived by sweeping lift values of the EGR valve 32 rather than positions of the exhaust throttle 74, and the EGR valve 32 and VGT control parameters may be independently controlled to effectuate desired EGR/fresh air flow conditions.

Figure 7:
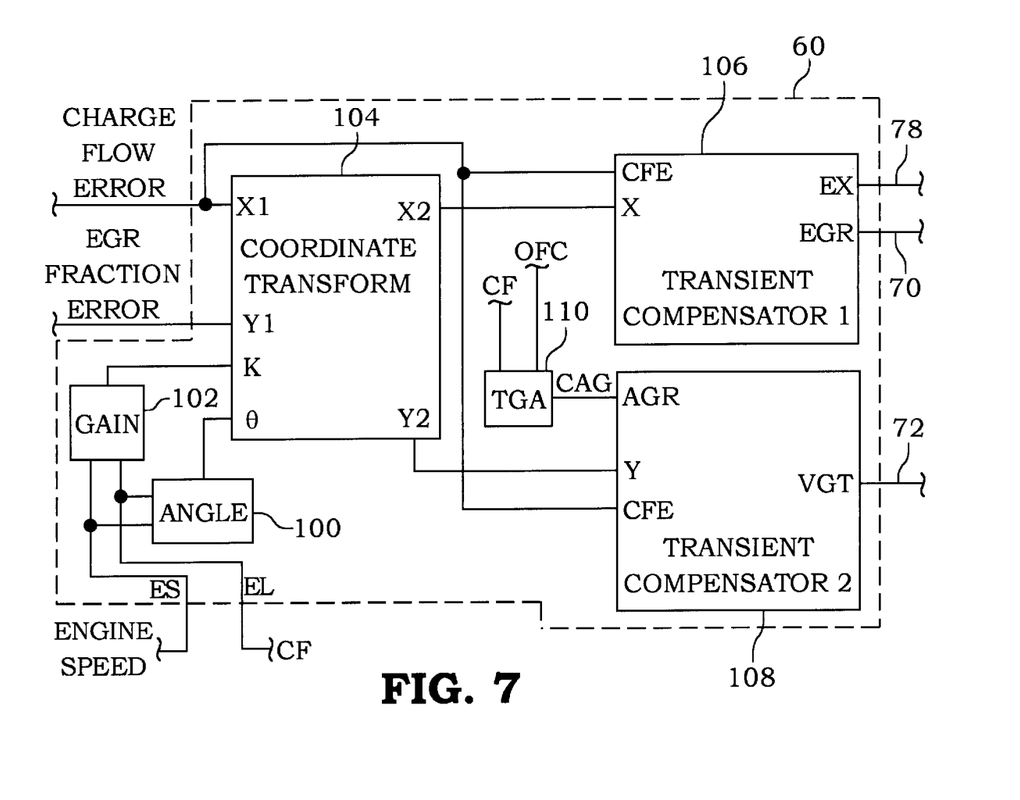
FIG. 7 is a diagrammatic illustration of one preferred embodiment of the MIMO transform manager of FIG. 2.
Figure 8:
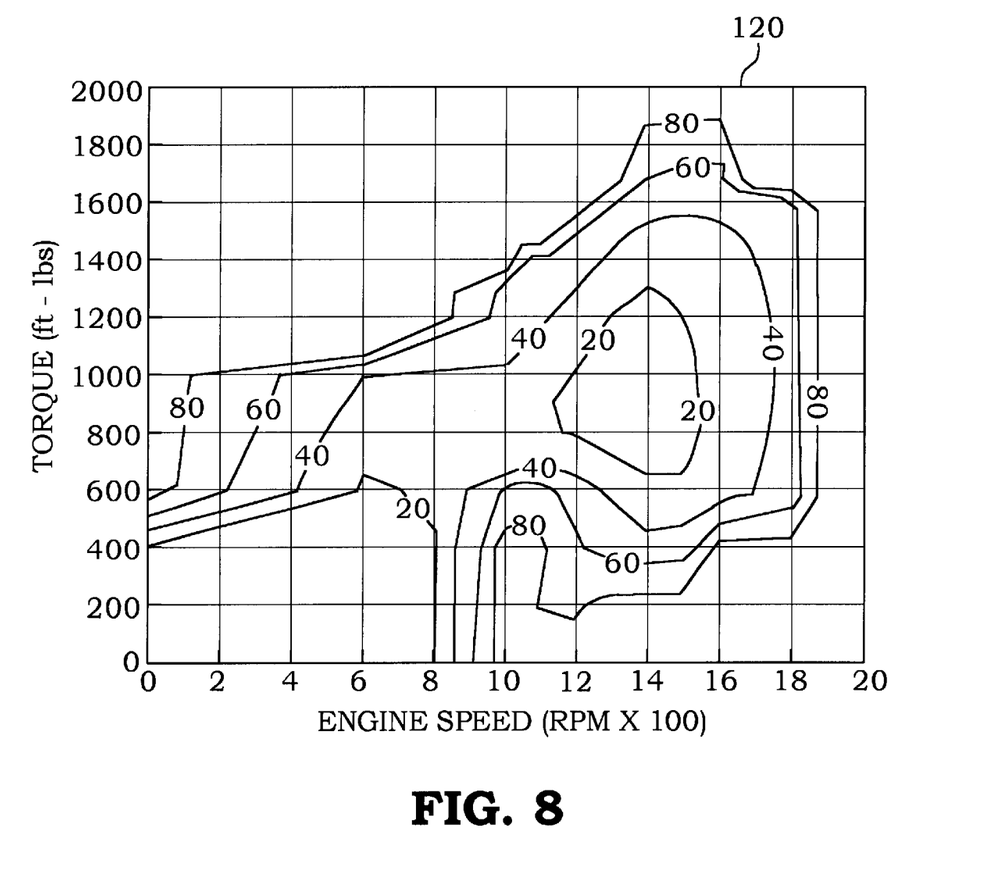
FIG. 8 is a plot of engine output torque vs. engine speed illustrating one preferred technique for mapping engine speed and commanded fueling values to a transform angle within the angle block of FIG. 7, in accordance with the present invention.

Referring now to FIG. 7, one preferred embodiment of the MIMO transform manager 60 of FIG. 2 is shown. It is to be understood that the various blocks illustrated in FIG. 7 are not intended to represent structural components, but are instead intended to represent functional features of the transform manager 60 that are typically accomplished via one or more software algorithms executable by the engine controller 56. In any case, manager 60 includes an angle block 100 and a gain block 102 each receiving the engine speed and commanded fueling signals and providing angle and gain values respectively to "K" and "θ" inputs respectively of a coordinate transform block 104. Block 104 additionally receives the charge flow error and EGR fraction error signals at inputs X1 and Y1 respectively, and produces transform output values in accordance with equation (1) at outputs X2 and Y2. Block 60 further includes a first transient compensator 106 having a first input "X" receiving the X2 transform value from the coordinate transform block 104 and a second input "CFE" receiving the charge flow error signal from the charge limit manager block 58 of the engine controller 56. Transient compensator block 106 produces the exhaust throttle (EX) and EGR valve (EGR) control signals provided on signals paths 78 and 70 respectively (see FIG. 2), and accordingly provides for control of the exhaust throttle 74 (if one is included in system 50) and EGR valve 32 independently of VGT control.

Manager 60 also includes a second transient compensator 108 having a first input "Y" receiving the Y2 transform value from the coordinate transform block 104 and a second input "CFE" receiving the charge flow error signal from the charge limit manager block 58 of the engine controller 56. Transient compensator 108 includes a third input "AGR" receiving a commanded aggressiveness value "CAG" from a transient gain adjustment block 110 receiving as inputs the commanded fueling value CF and an oxygen-to-fuel ratio value OFC. In one embodiment, OFC is an estimated value, and one preferred technique for estimating this quantity is detailed in co-pending U.S. patent application Ser. No. 09/775,068 entitled AN EQUIVALENCE RATIO-BASED SYSTEM FOR CONTROLLING TRANSIENT FUELING IN AN INTERNAL COMBUSTION ENGINE, which is assigned to the assignee of the present invention, and the disclosure of which is incorporated herein by reference. Alternatively, an OFC value may be computed using appropriate sensor information. In either case, TGA block 110 is operable to process the CF and OFC signals in a manner to be described more fully hereinafter, and provide a commanded aggressiveness value CAG to the transient compensator 108. Transient compensator block 108 produces the variable geometry turbocharger (VGT) control single provided on signal paths 72 (see FIG. 2), and accordingly provides for control of the turbocharger swallowing capacity independently of EGR valve and/or exhaust throttle control.

In one preferred embodiment, angle block 100 is provided as a graphical representation mapping engine speed values and engine load values (or commanded fueling values "CF") to correspondingly appropriate rotation angles for the coordinate transformation process according to equations (1)–(4) above. One example of such a plot 120 is illustrated graphically in FIG. 8 having angle values (θ) plotted as a function of engine output torque and engine speed. Current engine speed is provided by the engine speed sensor 62, and engine output torque is computed as function of current engine load, wherein engine load is computed as a function of commanded fueling using well-known equations. Alternatively, as described hereinabove, plot 120 may be constructed such that the commanded fueling values CF may be used directly. In either case, a current engine operating point, typically corresponding to current engine speed and load (or fueling) values, is mapped to a corresponding angle value, and the angle block 100 provides this value to the θ input of the coordinate transform block 104. It is to be understood that the angle block 100 may alternatively be provided as a table and/or one or more equations relating engine speed and load to appropriate angle values.

In one embodiment of system 50, the angle block 100 provides sufficient tracking of plot 90 (FIG. 4) over engine speed and load variances, and the gain block 102 in this case is set to a constant value (e.g., 100). However, in other systems the gain of the EGR fraction vs. charge flow relationship 90 may increase significantly with increasing engine speed and load. In such cases, gain block 102 may be configured to schedule gain values "K" as a function of engine speed and load in a similar manner to that described with respect to the angle block 100 to thereby normalize gain errors over engine speed and load ranges of interest.

Figure 9:
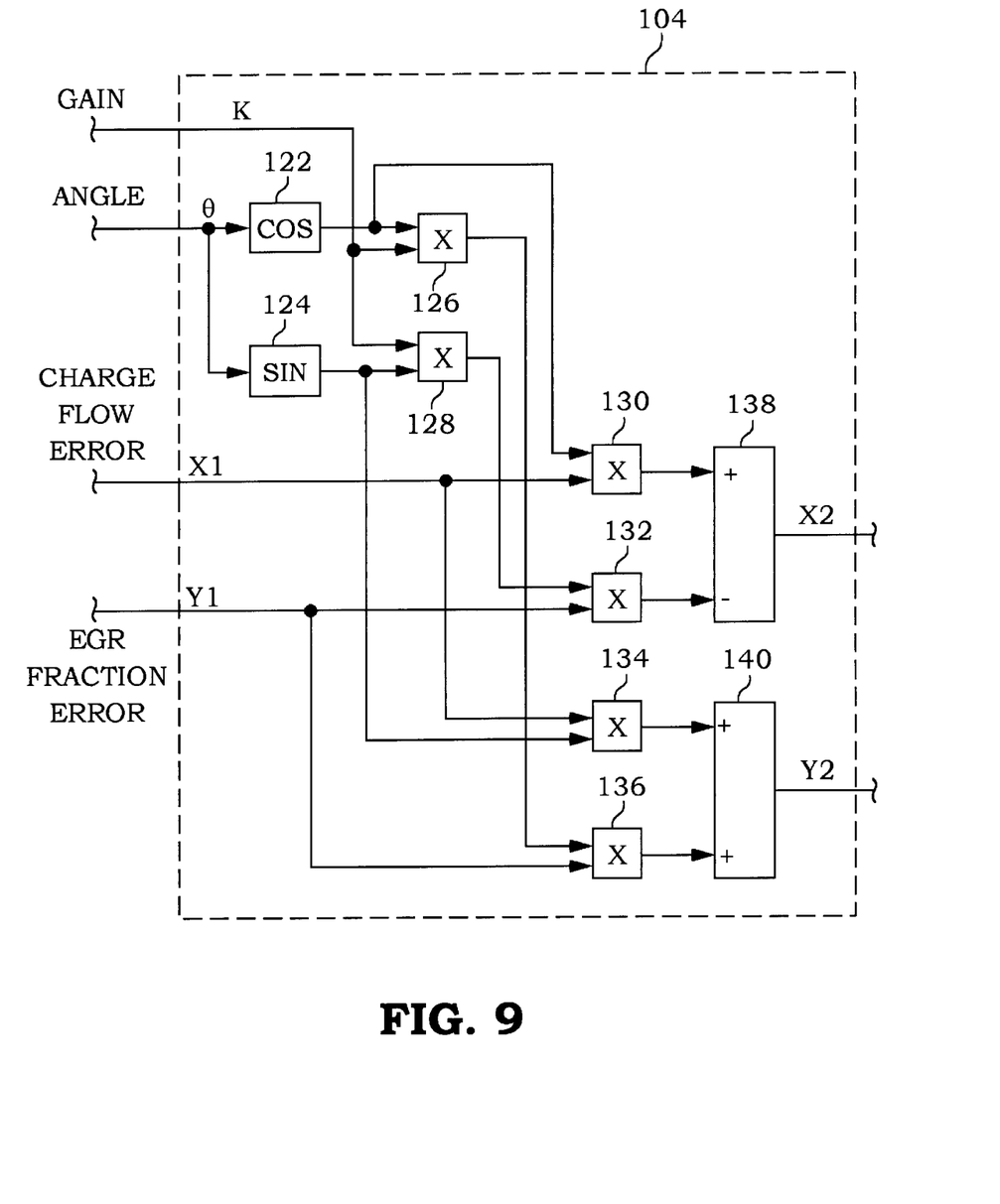
FIG. 9 is a diagrammatic illustration of one preferred embodiment of the coordinate transform block of FIG. 7, in accordance with the present invention.

Referring now to FIG. 9, one preferred embodiment of the coordinate transformation block 104 of FIG. 7 is shown. Block 104 includes a cosine function block 122 and a sine function block 124 each receiving the angle value from angle block 100, wherein an output of the cosine block 122 is provided to one input of a first multiplier 126 and to one input of a second multiplier 130, while an output of the sine block 124 is provided to one input of a third multiplier 128 and to one input of a fourth multiplier 134. The second inputs of the first and third multipliers 126 and 128 receive the gain value "K" from the gain block 102, and an output of the first multiplier is provided to one input of a fifth multiplier 136 while an output of the third multiplier is provided to a first input of a sixth multiplier 132. The second input of multiplier 130 receives the charge flow error signal from the charge limit manager 58 (FIG. 2) as does the second input of multiplier 134. Likewise, the second input of multiplier 132 receives the EGR fraction error signal from the charge limit manager 58 (FIG. 2) as does the second input of multiplier 136. The outputs of multipliers 130 and 132 are provided to non-inverting and inverting inputs respectively of a summation block 138, wherein the output of summation block 138 provides the X2 value of the transform. The outputs of multipliers 134 and 136 are provided to separate non-inverting inputs of another summation block 140, wherein the output of block 140 provides the Y2 transform value.

Figure 10:
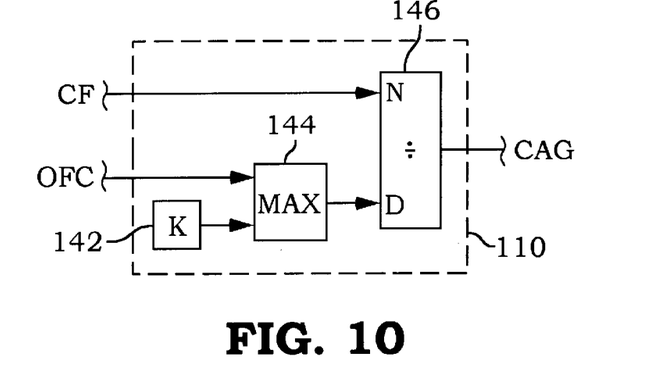
FIG. 10 is a diagrammatic illustration of one preferred embodiment of the transient gain adjustment block (TGA) of FIG. 7, in accordance with the present invention.

Referring now to FIG. 10, one preferred embodiment of the transient gain adjustment block 110 of FIG. 7 is shown. Block 110 includes a MAX block 144 receiving as inputs the OFC value and a constant value K provided by block 142. In one preferred embodiment, the constant value K is set to 1.0 such that the MAX block produces the larger of the OFC value and 1.0, although the present invention contemplates providing other values for the constant K in block 142. In any case, the maximum of the OFC and K values is provided as the denominator input to a division block 146, wherein block 146 includes a numerator input receiving the commanded fueling signal CF. The output of the division block 146 is the commanded aggressiveness value CAG. In cases where the oxygen-to-fuel ratio OFC is less than or equal to 1.0, the commanded aggressiveness signal will be equal to the commanded fueling value. However, in cases where the oxygen-to-fuel ratio is greater than 1, CAG will represent a ratio defining a current fueling deficit. Generally, the ratio is treated as an indicator of how severe the transient condition is, and as this ratio increases more oxygen is needed. Consequently, as the CAG ratio increases so does the need to control more aggressively to obtain more oxygen. In any case, the purpose of CAG will be described in greater detail hereinafter with respect to FIG. 13.

Figure 11:
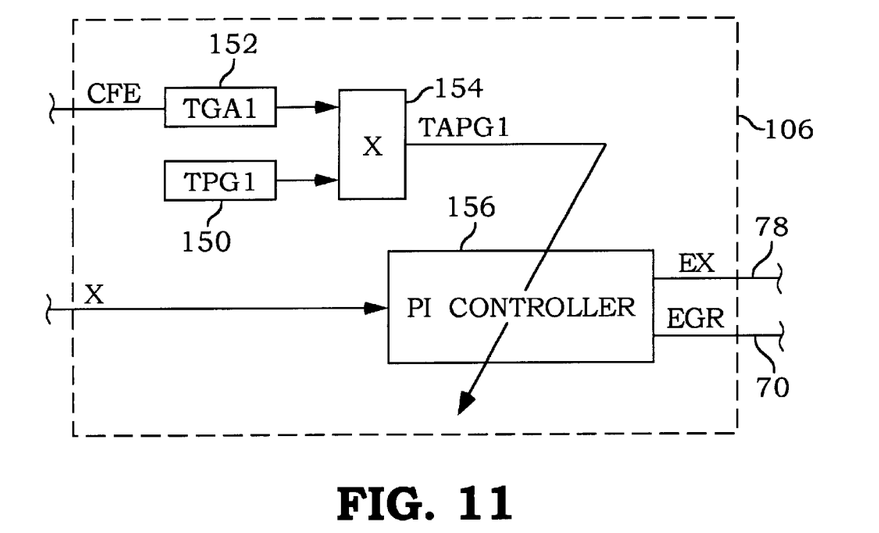
FIG. 11 is a diagrammatic illustration of one preferred embodiment of the transient compensatory block of FIG. 7, in accordance with the present invention.
Figure 12:
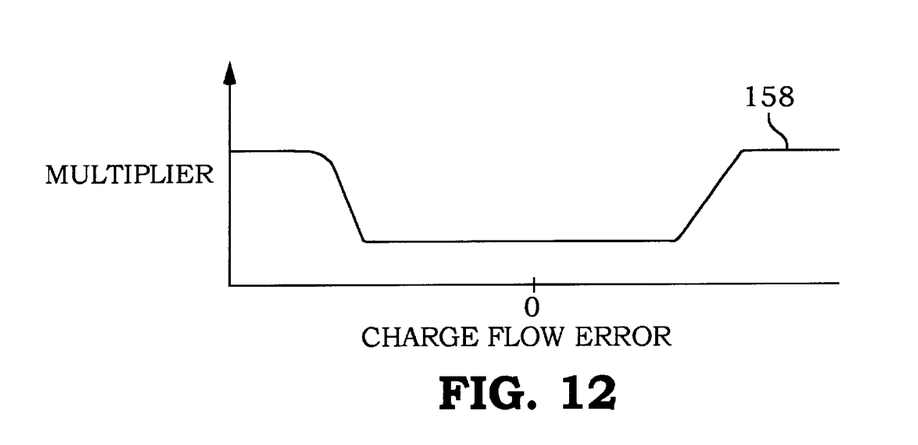
FIG. 12 is a plot of a relationship between charge flow error and a multiplier value for use with the transient gain adjustment blocks (TGA1 and TGA2) of FIGS. 11 and 13.

Referring now to FIG. 11, one preferred embodiment of the transient compensator 106 of FIG. 7 is shown. Compensator 106 includes a transient proportional gain (TPG1) block 150 producing a predetermined proportional gain value and providing this value to one input of a multiplier block 154. The second input of multiplier block 154 receives an output of a transient gain adjust (TGA1) block 152 receiving the charge flow error signal CFE as its input. Preferably, the transient gain adjust block 152 includes a multiplier function such as function 158 illustrated in FIG. 12. With the function 158 shown in FIG. 12, the charge flow error is multiplied by a first value (e.g., 1.0) if the charge flow error is small, but is multiplied by a larger value if the charge flow error is large. The output of multiplier block 154 provides a transient adjusted proportional gain value TAPG1 based on the product of the TGA1 multiplied charge flow error and the predetermined proportional gain value produced by the TPG1 block 150. The transient adjust proportional gain value TAPG1 is then used to modify the proportional gain of a proportional-integral (PI) controller 156 receiving as its input the X2 transform value from the coordinate transform block 104, and producing the EX and EGR control signals on signal paths 78 and 70 respectively. One preferred embodiment of such a PI controller 156 that is particularly suitable for use with the present invention is described in co-pending U.S. patent application Ser. No. 774,425, entitled CLOSED-LOOP ACTUATOR CONTROL SYSTEM HAVING BUMBLESS GAIN AND ANTI-WINDUP LOGIC, which is assigned to the assignee of the present invention, and the disclosure of which is incorporated herein by reference. It is to be understood, however, that while compensator block 106 is illustrated in FIG. 11 as including a PI controller, the present invention contemplates that block 106 may alternatively include other compensation strategies such as, for example, a lead-lag compensator in which case the charge flow error signal may be used to adjust corresponding gain values thereof in order to compensate for transient effects. Details of such other compensator and transient gain adjustment strategies are well within the knowledge of skilled artisan.

In the operation of compensator block 106, the charge flow error under steady state conditions should be relatively small such that the transient adjusted proportional gain value TAPG1 is likewise small and will therefore not affect the gain of the P1 controller 156. However, under transient conditions, the charge flow error may be significantly larger such that the transient adjusted proportional gain value TAGP1 will therefore be much larger and will accordingly increase the proportional gain of the PI controller 156 to thereby provide for faster response time of system 50 to transient conditions.

Figure 13:
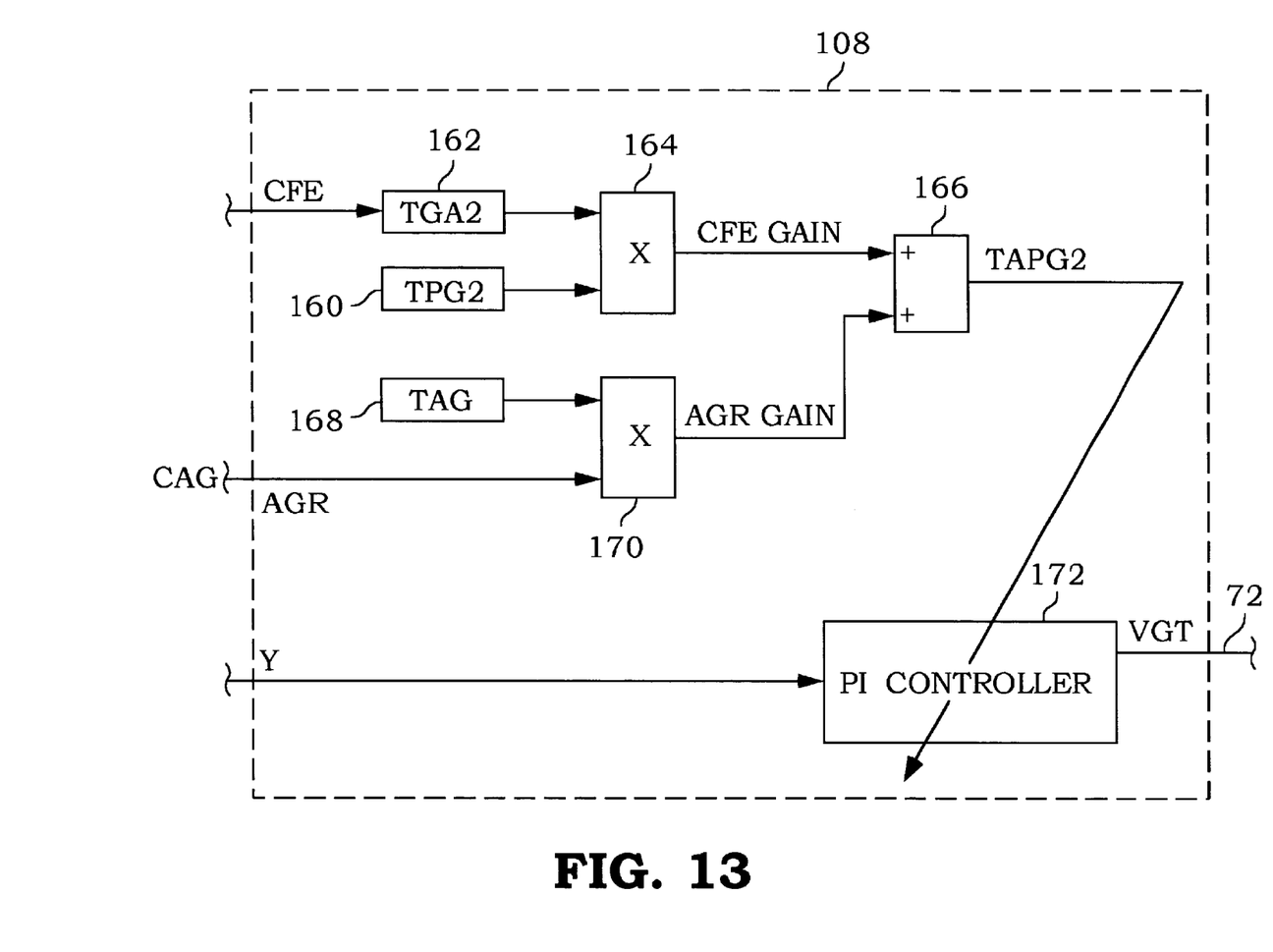
FIG. 13 is a diagrammatic illustration of one preferred embodiment of the transient compensator2 block of FIG. 7, in accordance with the present invention.

Referring now to FIG. 13, one preferred embodiment of the transient compensator 108 of FIG. 7 is shown. Compensator 108 includes a transient proportional gain (TPG2) block 160 producing a predetermined proportional gain value and providing this value to one input of a multiplier block 164. The second input of multiplier block 164 receives an output of a transient gain adjust (TGA2) block 162 receiving the charge flow error signal CFE as its input. Preferably, the transient gain adjust block 162 is similar to the transient gain adjust block 152 of FIG. 12 and accordingly includes a multiplier function such as function 158 illustrated in FIG. 12. With the function 158 shown in FIG. 12, the charge flow error is multiplied by a first value (e.g., 1.0) if the charge flow error is small, but is multiplied by a larger value if the charge flow error is large. The output of multiplier block 164 provides a charge flow error gain value CFE GAIN based on the product of the TGA2 multiplied charge flow error and the predetermined proportional gain value produced by the TPG2 block 160, wherein TPG2 is typically not equal to TPG1. Compensator 108 further includes a transient adjusted gain block 168 producing a predefined gain value TAG to a first input of another multiplier block 170. A second input of multiplier block 170 receives the aggressiveness value AGR from the transient gain adjust block 110 of FIGS. 7 and 10, and the output of multiplier block 170 provides an aggressiveness gain value AGR GAIN based on the product of the predefined transient adjusted gain value TAG and the aggressiveness value AGR. The CFE GAIN and AGR GAIN values produced by multiplier blocks 164 and 170 respectively are provided to separate non-inverting inputs of a summation block 166. The output of summation block 166 provides a transient adjusted proportional gain value TAPG2 based on the sum of the CFE GAIN and AGR GAIN values. The transient adjusted proportional gain value TAPG2 is then used to modify the proportional gain of a proportional-integral (PI) controller 172 receiving as its input the Y2 transform value from the coordinate transform block 104, and producing the VGT control signal on signal path 72. As with the compensator block 106 described hereinabove with respect to FIG. 11, one preferred embodiment the PI controller 172 of FIG. 13 that is particularly suitable for use with the present invention is described in co-pending U.S. patent application Ser. No. 09/774,425, entitled CLOSED-LOOP ACTUATOR CONTROL SYSTEM HAVING BUMBLESS GAIN AND ANTI-WINDUP LOGIC. It is to be understood, however, that while compensator block 108 is illustrated in FIG. 13 as including a PI controller, the present invention contemplates that block 108 may alternatively include other compensation strategies such as, for example, a lead-lag compensator in which case the charge flow error signal may be used to adjust corresponding gain values thereof in order to compensate for transient effects. Details of such other compensator and transient gain adjustment strategies are well within the knowledge of skilled artisan.

In the operation of compensator 108, the charge flow error (CFE) under steady state conditions should be relatively small such that the CFE GAIN value is likewise small. Also under such conditions, the OFC value should be very close to 1.0 so that the aggressiveness value AGR will be substantially equal to the commanded fueling value CF. The predefined transient adjusted gain value TAG of block 168 is preferably a small value so that the resulting AGR GAIN value under steady state conditions is likewise small. The resulting transient adjusted proportional gain value TAPG2 under steady state operating conditions is accordingly a small value and will therefore generally have little or no effect on the resultant gain of the PI controller 172. However, under transient conditions, the charge flow error may be significantly larger such that the CFE GAIN value will accordingly be much larger. Under such transient conditions, the OFC value will typically increase such that the AGR GAIN value will decrease. The resulting transient adjusted proportional gain value TAPG2 will therefore have a value that is larger than in the steady state case and will accordingly increase the proportional gain of the PI controller 172 to thereby provide for faster response time of system 50 to transient conditions.

It should be appreciated from the foregoing that the present invention is directed to an EGR control strategy wherein EGR valve and/or exhaust throttle control is decoupled from VGT control such that these parameters may be controlled individually and independently to thereby provide for better and more consistent control of EGR and fresh air flow, and therefore provide for greater control over the resulting mass charge flow. This decoupling is preferably achieved via a linear transformation of charge flow error (CFE) and EGR fraction error space (or alternatively charge flow and EGR fraction space) as a function of engine speed and engine load. The resulting transformed control parameters are fed to separate compensators (preferably PI controllers) for independent control of the EGR valve 32/exhaust throttle 74 and VGT actuator. The EGR/exhaust throttle compensator includes provisions for adjusting its compensator gain value under transient operating conditions as a function of charge flow error and the VGT compensator includes provisions for adjusting its compensator gain as a function of charge flow error and as a function of oxygen/fuel content (OFC).

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A method of controlling an EGR flow control system of an internal combustion engine, the method comprising the steps of:
   receiving commanded charge flow and EGR fraction values;
   determining a current engine operating point;
   performing a coordinate transformation on said commanded charge flow and EGR fraction values as a function of said current engine operating point and producing a first transform value in accordance therewith; and
   controlling a first charge flow control actuator independently of any other charge flow control actuator based on said first transform value.

2. The method of claim 1 wherein the step of determining a current engine operating point includes:
   determining a current engine speed value; and
   determining one of a current engine load value and a current commanded fuel value;
   and wherein the performing step includes performing a coordinate transformation on said commanded charge flow and EGR fraction values as a function of said engine speed value and said one of a current engine load value and a current commanded fuel value and producing said first transform value in accordance therewith.

3. The method of claim 1 wherein said first charge flow control actuator is an EGR valve.

4. The method of claim 1 wherein said first charge flow control actuator is an exhaust throttle.

5. The method of claim 1 wherein said first charge flow control actuator is a variable geometry turbocharger actuator.

6. The method of claim 1 wherein said current engine operating point defines an angle $\theta$ of transform rotation, said commanded charge flow corresponds to a first variable X1, said commanded EGR fraction corresponds to a second variable Y1, said first transform value corresponds to one of a third variable X2 and a fourth variable Y2;
   and wherein said coordinate transform is carried out according to:

$$\begin{bmatrix} X2 \\ Y2 \end{bmatrix} = \begin{bmatrix} \cos\theta & -\sin\theta \\ \sin\theta & \cos\theta \end{bmatrix} \begin{bmatrix} X1 \\ Y1 \end{bmatrix}.$$

7. The method of claim 6 wherein the step of determining a current engine operating point includes:
   determining a current engine speed value; and
   determining one of a current engine load value and a current commanded fuel value.

8. The method of claim 6 wherein said current engine operating point defines a gain variable k;
   and wherein said coordinate transform is carried out according to:

$$\begin{bmatrix} X2 \\ Y2 \end{bmatrix} = \begin{bmatrix} \cos\theta & -K\sin\theta \\ \sin\theta & K\cos\theta \end{bmatrix} \begin{bmatrix} X1 \\ Y1 \end{bmatrix}.$$

9. The method of claim 8 wherein the step of determining a current engine operating point includes:
   determining a current engine speed value; and
   determining one of a current engine load value and a current commanded fuel value.

10. The method of claim 1 wherein the performing step further includes producing a second transform value in accordance with said coordinate transformation;
    and further including the step controlling a second charge flow control actuator independently of said first charge flow control actuator based on said second transform value.

11. The method of claim 10 wherein said first charge flow control actuator is one of an EGR valve and an exhaust throttle, and said second charge flow control actuator is a variable geometry turbocharger actuator.

12. The method of claim 10 wherein said first charge flow control actuator includes an EGR valve and an exhaust throttle, and said second charge flow control actuator is a variable geometry turbocharger actuator.

13. The method of claim 10 wherein said current engine operating point defines a angle $\theta$ of transform rotation, said commanded charge flow corresponds to a first variable X1, said commanded EGR fraction corresponds to a second variable Y1, said first transform value corresponds to a third variable X2, and said second transform value corresponds to a fourth variable Y2;
    and wherein said coordinate transform is carried out according to:

$$\begin{bmatrix} X2 \\ Y2 \end{bmatrix} = \begin{bmatrix} \cos\theta & -\sin\theta \\ \sin\theta & \cos\theta \end{bmatrix} \begin{bmatrix} X1 \\ Y1 \end{bmatrix}.$$

14. The method of claim 13 wherein the step of determining a current engine operating point includes:
    determining a current engine speed value; and determining one of a current engine load value and a current commanded fuel value.

15. The method of claim 13 wherein said current engine operating point defines a gain variable k;

and wherein said coordinate transform is carried out according to:

$$\begin{bmatrix} X2 \\ Y2 \end{bmatrix} = \begin{bmatrix} \cos\theta & -K\sin\theta \\ \sin\theta & K\cos\theta \end{bmatrix} \begin{bmatrix} X1 \\ Y1 \end{bmatrix}.$$

16. The method of claim 15 wherein the step of determining a current engine operating point includes:

determining a current engine speed value; and determining one of a current engine load value and a current commanded fuel value.

17. The method of claim 1 further including the step of determining a controller gain based on said commanded charge flow value;

and wherein the controlling step includes controlling said first charge flow control actuator based on said first transform value as a function of said controller gain.

18. The method of claim 17 wherein said first charge flow control actuator is an EGR valve.

19. The method of claim 17 wherein said first charge flow control actuator is an exhaust throttle.

20. The method of claim 17 further including the steps of:

determining an aggressiveness value based on said commanded charge flow value and on an oxygen/fuel ratio value; and determining said controller gain further based on said aggressiveness value;

and wherein the controlling step includes controlling said first charge flow control actuator based on said first transform value as a function of said controller gain.

21. The method of claim 20 wherein said first charge flow control actuator is a variable geometry turbocharger actuator.

* * * * *

UNITED STATES PATENT AND TRADEMARK OFFICE
CERTIFICATE OF CORRECTION

PATENT NO.     : 6,408,834 B1
DATED          : June 25, 2002
INVENTOR(S)    : Brackney et al.

It is certified that error appears in the above-identified patent and that said Letters Patent is hereby corrected as shown below:

Title page,
Item [75], Inventors: please delete "Lary J. Brackney" and insert -- Larry J. Brackney --.

Column 2,
Line 40, please delete "compensatory" and insert -- compensator1 --.

Signed and Sealed this

Nineteenth Day of November, 2002

Attest:

Attesting Officer

JAMES E. ROGAN
Director of the United States Patent and Trademark Office